United States Patent [19]

Cohen et al.

[11] Patent Number: 4,595,578

[45] Date of Patent: Jun. 17, 1986

[54] STABILIZED SILICA GEL AND PROCESS FOR MAKING SAME

[75] Inventors: Howard J. Cohen, Baltimore; Peter van der Heem, Perryville; Steven J. Fitch, Baltimore, all of Md.

[73] Assignee: SCM Corporation, New York, N.Y.

[21] Appl. No.: 714,799

[22] Filed: Mar. 22, 1985

[51] Int. Cl.$^4$ ............................................ C01B 33/16
[52] U.S. Cl. ..................................... 423/338; 423/339
[58] Field of Search ................................. 423/338, 339

[56] References Cited

U.S. PATENT DOCUMENTS

| | | | |
|---|---|---|---|
| 3,794,713 | 2/1974 | Aboutboul | 423/338 |
| 3,959,174 | 5/1976 | Winyall | 423/338 |
| 4,256,682 | 3/1981 | Denton | 423/338 |

Primary Examiner—Peter D. Rosenberg
Attorney, Agent, or Firm—Robert A. Sturges

[57] ABSTRACT

There is provided an improved process for producing a silica gel having improved pore volume relative to conventional silica gels which comprises the steps of gelling an aqueous alkali metal silicate with an aqueous acid, washing the resulting gel to remove salt or salts and acid, and soaking the gel in an aqueous solution of a water soluble aluminum salt to impart from 0.1% to 0.7% by weight aluminum on the dry basis to said gel, drying and reducing the particle size of the dried gel to from 2.0 to 15 microns, said particles having a pore volume in the range of 1.25 to 2.25 cm$^3$/gram. and a product produced by said process.

16 Claims, No Drawings

STABILIZED SILICA GEL AND PROCESS FOR MAKING SAME

This invention relates to an improved silica gel, and more particularly an improved silica gel which is characterized by an enhanced ability to retain its pore volume during processing to a better degree than conventionally treated silica gels. The process is characterized by treatment of the silica gel after neutralization and chemical treatment ("aging") with an aqueous solution of an aluminum salt, e.g., aluminum nitrate or aluminum sulfate.

BACKGROUND OF THE INVENTION AND PRIOR ART

Silica gels, whether hydrogels or aerogels, are well known. (See Iler, "The Chemistry of Silica", John Wiley & Sons 1979, ISBN 0-471-02404-X). Reference may also be had to U.S. Pat. No. 2,856,268 to L. O. Young and dated Oct. 14, 1958 for preparation of hydrogels suitable for the treatment described herein. Aerogels, or xerogels as they may be called, are dried hydrogels. They are also amorphous. Reference may also be had to the article by Mitchell "The Surface Properties of Amorphous Silicas" printed in *Chemistry and Industry*, June 4, 1966 at pages 924–932. These references are incorporated herein by reference thereto.

Experience has shown that almost any physical treatment performed on a silica gel after its formation results in a decrease in pore volume (PV) if we consider pore volume to be the difference between the volume of the gel and the volume of $SiO_2$ in this gel. Silica gels as initialy formed may have a wide range of pore volumes from about 2 to about 50 cm$^3$/gm. depending on many factors as shown in the art. Those of particular commercial interest have pore volumes less than 10 cm$^3$/gram, e.g., about 4.5 cm$^3$/gm. Thus, washing to remove acid results in a decrease in pore volume. Aging results in a still further reduction in pore volume. By the time a silica gel with an initial pore volume of, e.g., 4.5 cm$^3$/g. is dried and milled to its final particle size in the range of 2 to 15 microns, its pore volume has decreased to from 20% to 39% of its original pore volume.

According to the present invention, we are able to stabilize the pore volume so that it decreases substantially less during physical treatment than that experienced with similar gels not treated in accordance with this invention. This is commercially significant in at least one area of use of the gels hereof; for example, the flatting of coating compositions, e.g, paints, varnishes, lacquers, enamels, and the like. The higher the pore volume, the lower the density of the gel particles. Hence, a smaller weight of silica particles of a predetermined size can be used effectively to produce a desired degree of flatting.

BRIEF STATEMENT OF THE INVENTION

Briefly stated, the present invention is in a process for producing a silica gel having improved pore volume relative to conventional silica gels which comprises the steps of gelling an aqueous alkali metal silicate with an aqueous acid, washing the resulting gel to remove salt or salts and acid, and soaking the gel in an aqueous solution of a water soluble aluminum salt to impart from 0.1% to 0.7% by weight aluminum on the dry basis to said gel, drying and reducing the particle size of the dried gel to from 2.0 to 15 microns, said particles having a pore volume in the range of 1.25 to 2.25 cm$^3$/gram. The invention also contemplates a product produced in accordance with the foregoing process.

DETAILED DESCRIPTION OF THE INVENTION AND SPECIFIC EXAMPLES

The formation of fine particle silica gels, of either the hydrogel or aerogel type is well known and involves acidifying an aqueous solution of an alkali metal silicate with a mineral acid, e.g., sulphuric acid, breaking up the gel, washing and aging, followed by drying and milling, or simultaneously drying and milling as in a fluid energy mill. The present invention inserts an additional step after the aging step, i.e., soaking the gel for a period of ½ to 8 hours in an aqueous solution of a water soluble aluminum salt, e.g., aluminum nitrate, aluminum sulfate, aluminum acetate, aluminum formate, aluminum oxalate, aluminum chloride. Salts containing anionic aluminum, such as, sodium aluminate do not work. The final products contain a small amount of aluminum, calculated as the metal and in the range of 0.1 to 0.7% aluminum. This small amount of aluminum in a form as yet unknown to us, appears to strengthen the micropores in the gel so as to enable it better to withstand physical treatments such as drying and size reduction without as great a shrinkage in pore volume. This we term "stabilization".

The following discussion will have reference to aluminum stabilized hydrogels (ASH) and aluminum stabilized aerogels (ASA). It was found that the ASH gels provided somewhat higher pore volumes than ASA gels and were also free of overgrind sensitivity previously observed in ASA gels. It was also found to be desirable to wash the aged gel to remove residual ammonia to prevent reaction with the aluminum salt to form ammonium salts, and to eliminate variations in pore volume of a given gel in subsequent treatment. After treatment of the gel with the aqueous aluminum salt solution, another wash was found to be desirable to remove and excess aluminum salt anion for environmental reasons. Very rapid or flash drying was found to favor retention of porosity. Loss of pore volume during milling was largely eliminated by using a more lightly aged gel, e.g., 9 hours vs. 18 hours or more.

The pore volume of the ASH products which result from the improved process was about 2.0 cc/gm. (cubic centimeters per gram) compared to pore volumes of 1.1 to 1.7 for standard prior hydrogels and aerogels, respectively. The pore volumes obtained by rapid drying were found to be independent of the aluminum salt soak solution pH between 1.0 and 4.5 making unnecessary close control of pH. Two drying methods were found to give consistently higher pore volumes: (1) heating a thin layer of the gel in a preheated dish in a muffle furnace at 500° to 600° C. and (2) direct exposure of the gel to burner flames as the particles pass along an iron channel or flight as in a direct fired rotary kiln.

Hot fluid energy milling of ASH to reduce the particle size was found usually to cause smaller losses in PV compared to normal operation of the mill which showed a larger loss of PV. Shorter aging times, i.e., down to about 3 hours, can be achieved depending upon the temperature and pH of the aging solution. This ASH product was the best ASH for flatting a polyester coil coating. (See Example I below).

The following Table I shows the properties of examples of ASA gels. All examples were soaked in aluminum nitrate solutions containing 5.1 grams/liter aluminum nitrate nonahydrate. 1000 grams of wet gel/10 liters of aluminum nitrate solution were used.

TABLE I

| SAMPLE | AGING TIME (HRS) | MZR SIZE* (in.) | INJ/RING (psi) | FEED RATE | PORE VOL. (cc/g) | REMARKS |
|---|---|---|---|---|---|---|
| 1 | 9 | 4½ | 100/80 | 43 | 1.82 | Oil Absorption = 260 |
| 2 | 9 | 4½ | 100/80 | 41 | 1.77 | Specific Resistance = 1700 ohms. |
| 3 | 9 | 4½ | 100/80 | 40 | 1.86 | Washed sample with water |
| 4 | 9 | 4½ | 100/80 | 41 | 1.81 | Adjusted pH of aluminum nitrate solution to pH = 3.9. |
| 5 | 9 | 4½ | 100/80 | 40 | 1.79 | Washed with water. |
| 6 | 18 | 4½ | 100/80 | 37 | 1.56 | |
| 7 | 9 | 4½ | 100/80 | 38 | 1.75 | Same as 4, except washed with $NH_4OH$ solution (3×) (pH = 9.8). |
| 8 | 9 | 4½ | 100/80 | 38 | 1.80 | Same as 4, except washed with water (3×). |
| 9 | 9 | 4½ | 100/90 | 46 | 1.54 | Washed with water (3×) |

| SAMPLE | SURFACE AREA (m²/g) | CENTRIFUGE DENSITY (g/cc) | MEDIAN PARTICLE SIZE, μ | % AL | $NO_3$ (ppm) | REMARKS |
|---|---|---|---|---|---|---|
| 1 | 289 | 0.17 | 3.25 | 0.20 | 1800 | Oil Absorption = 260. |
| 2 | 286 | 0.17 | 2.90 | 0.20 | 3500 | Specific Resistance = 1700 ohms. |
| 3 | 292 | 0.18 | 3.50 | 0.17 | 1000 | Washed sample with water. |
| 4 | 290 | 0.18 | 3.25 | 0.29 | 2000 | Adjusted pH of aluminum nitrate solution to pH = 3.9. |
| 5 | 277 | 0.17 | 3.35 | 0.21 | 700 | Washed with water |
| 6 | 220 | 0.18 | 2.80 | 0.26 | 1180 | |
| 7 | 273 | 0.18 | 3.45 | 0.21 | 539 | Same as 4, washed with $NH_4OH$ solution (3×) (pH = 9.8) |
| 8 | 268 | 0.18 | 3.55 | 0.19 | 740 | Same as 4, except washed with water (3×). |
| 9 | 280 | 0.17 | 2.45 | 0.15 | 430 | Washed with water (3×). |

*Fluid energy mill ring size.

The following Table II shows the properties of ASH and ASA gels treated in accordance herewith compared to a commercially available gel in a polyester coil coating.

TABLE II

PLANT RUN
Comparison of Improved ASH with improved ASA and a Standard Flatting Silica

| SILICA SAMPLES | % AL | Oil Abs. g/100 g | Pore Vol. cc/g | Surface Area m²/g. | Median Particle Size, μ | Hegman | Polyester Flatted Coil Coating Gloss 60° | Gloss 85° |
|---|---|---|---|---|---|---|---|---|
| Commercial A (STD) | | | | | | 4¾ | STD | STD |
| Improved (ASH) | 0.18 | 258 | 1.74 | 289 | 4.05 | 5¼ | −12 | −35 |
| Improved (ASA) | | | | | | | | |
| A | 0.13 | 248 | 1.71 | 296 | 3.65 | 5¾ | −10 | −27 |
| B | 0.18 | 274 | 1.65 | 274 | 4.30 | 5¼ | −15 | −38 |
| C | 0.17 | 258 | 1.76 | 301 | 5.00 | 5¼ | −15 | −38 |
| D | 0.17 | 271 | 1.71 | 300 | 4.55 | 5¼ | −12 | −30 |
| E | 0.14 | 281 | 1.68 | 281 | 3.90 | 5¼ | −14 | −30 |

Preferred ASA materials had the following physical properties:

| | SAMPLE 1 | SAMPLE 2 |
|---|---|---|
| Pore Volume | 1.8 cm³/g. | 1.85 cm³/g. |
| Surface Area | 283 m²/gm. | 252 m²/gm. |
| Centrifuge Density | 0.17 g/cc. | 0.18 g/cc. |
| Aluminum | 0.20% | 0.40% |
| Particle Size (Elzone) | 3.25 microns | 9.1 microns |

In general, the products of this invention have the following physical characteristics: The pore volume is high compared to standard commercially available gels, (for example "Silcrons" products of SCM Corp.—Pigments which are, i.e., broadly 1.2 to 1.6 cc/gm.) and is most usually 1.54 to 1.86 cc/gm. The surface area is broadly in the range of 150 to 400 square meters/gram and desirably 220 to 292 m²/gm. The acidity of the products is broadly in the range of 3.0 to 4.5 pH in a 5% aqueous slurry, and preferably 3.0 to 3.6 pH. The median particle size is 2.0 to 15 microns and preferably 5 to 8 microns. The density (centrifuge) is 0.14 to 0.25 grams/cc. The oil absorption is broadly 175 to 350 grams linseed oil/100 grams of silica (or pounds of linseed oil/100 pounds of silica product), and desirably 225 to 300. Chemically, these products are at least 99% silica on dry basis (dried at 200° C. under vacuum). They contain 0.28 to 0.8% aluminum in unwashed samples and from 0.10 to 0.30% in washed samples. The amount of aluminum in the best samples is 0.17 to 0.19%.

The present method for making aerogels requires the reaction of a 35° to 36° Baume solution of sulfuric acid with a 32° Baume solution of sodium silicate (3.22/1 Ratio of $SiO_2/Na_2O$) to form a mixture that polymerizes on standing to form a gel. The gel is allowed to set for approximately one hour, then sized and washed with water to remove the excess acid and the sodium sulfate. The water is replaced with an ammonia solution and the gel is aged for from 3 to 36, e.g., 9 or 18 hours. The solution is than drained and the wet gel is fluid energy milled with hot air (or steam) at a relatively high temperature above 500° C. to rapidly remove the water and replace it with air without collapsing the gel. This results in a pore volume of 1.5 to 1.6 cc/g. Soaking the sample with aluminum nitrate solution prior to fluid energy milling does not increase the pore volume. However, reducing the ammonia aging time of the gel increases the pore volume to 1.74 cc/g, and treating the sample with aluminum nitrate solution increases the pore volume to 1.86 cc/g., or higher.

EXAMPLE I 3420 cc of 35° Baume Sulfuric acid and 8000 cc of 32° Baume Sodium Silicate were reacted at room temperature over a period of 19 minutes, the temperature reacting 43° C. The acid and silicate solutions were blended by pumping through an aspirator type plastic tube, the acid being flowed at a rate of 297 cc/minute and the silicate at the rate of 814 cc/minute. The running time of the acid was 11.5 minutes, and that of the silicate was 9 minutes 50 seconds. The gel was allowed to set, cut and as is conventional it was broken up in a chopper to a manageable size for washing.

The resulting hydrosol was clear. It was washed with water at 120° F. to a pH at 6.5. The gel was washed twice with aqueous ammonia solution at 182° F. and 9.75 pH and 180° F. and 9.6 pH, respectively. The pH of the wash solution after two washes was 9.05 at 45° C. The gel was then overflow washed with 150° F. city water for 15 minutes after which the pH taken from the top was 8.3 but after returning through the gel, a 9.3 pH was found. The gel was then aged.

After aging for 18 hours, the wet gel was soaked for 4 hours in an aqueous solution of aluminum nitrate nonahydrate in city water. The following Table A shows the various samples concentrations of $Al_2(NO_3)_3.9H_2O$, temperature of soak and blot pore volume. In determining blot pore volume a weighed sample of wet gel (deionized water) is placed on a filter paper surface and moved around to dry areas on the paper, until the gel is dry. The sample is again weighed and the water weight loss determined. This gives a measure of the pore volume as the water loss/gram of sample and converts readily to cc/gm. which is pore volume as determined by the blot method.

TABLE A

| SAMPLE NO. | $Al(NO_3)_3$ Grams/ Liter | Wash Procedure | Temperature of $Al(NO_3)_3$ sol. | Blot P.V. cc/grams. |
|---|---|---|---|---|
| I-1 | 5.1 | None | 23° C. | 1.52 |
| I-2 | 8.6 | None | 23° C. | 1.56 |
| I-3 | 5.1 | 9x | 23° C. | 2.34 |
| I-4 | 8.6 | 9x | 23° C. | 2.38 |
| I-5 | 5.1 | None | 66° C. | 1.59 |
| I-6 | 8.6 | None | 66° C. | 1.61 |
| I-7 | 5.1 | 9x | 66° C. | 2.38 |
| I-8 | 8.6 | 9x | 66° C. | 2.40 |
| I-9 | 5.1 | 15 min. Overflow | 23° C. | 2.27 |
| I-10 | 8.6 | 15 min. Overflow | 23° C. | 2.41, 2.38 |

Soaked large sample (6400 g) wet gel using indicated concentration of $Al(NO_3)_3.9H_2O$ in city water for 4 hours. The soaking was done using a pump for a flow thru system. After 4 hrs. the pump is shut off and the $Al(NO_3)_3$ solution drained back into the holding tank. The sample sat for 14 hours after the soaking before being dried.

The soaking in aluminum nitrate solution was done using a pump. After 4 hours, the pump is shut off and the aluminum nitrate solution drains back into a holding tank. The gel sample remained untouched for 14 hours after the soaking before being dried.

The material taken from the soaking tank (as is) had a blot PV of 2.30. After 2 water washes the blot PV was 2.31. The fluid energy mill feed sample had on aluminum content of 0.30%, a PV of 2.03 and a surface area of 233 m²/gm.

A specific sample of fluid energy mill feed stock was an 18 hour aged gel, washed for 15 minutes after aging with 66° C. city water and then soaked in $Al(NO_3)_3.9H_2O$, at 8.6 gms./liter, by flowing through the gel at 1 gal per minute for 2 hours. Small, thin batches were flash dried at 600° C. The average blot PV at this point was 2.20 cc/gm.

The specific sample immediately above-described was then milled in a Sturtevant "Micronizer" mill using steam at 600° C. for a period of 1 minute 10 seconds in a first sample and 1 minute 8 seconds for a second sample. The mill temperature was 530° C.

The flow rate was 5.2 and 5.4 cu. ft./sec. at an inlet pressure of 80 psi and a pressure drop of 10 psi. The feed rate of gel was 111 g/15 seconds. The ring diameter was 4.5" and thimble ¼". The by-pass was closed. The finished product had a median particle size of 5.2 microns, a Digisorb PV of 1.97, a specific area of 237 m²/gm. and analyzed 0.30% Al. The centrifuge density was 0.17 grams/cubic centimeter. (Digisorb is a commercially available meter for measuring pore volume and surface area, Digisorb 2500, from Micromeritics Corp.).

In a replicative sample, the steam temperature was 600° C. and the fluid energy mill temperature was 510° C. The flow rate was 4.4 cubic ft./sec. and the inlet/outlet pressures were 60/50. The gel feed rate was 13.5 g./15 sec. Otherwise the conditions were the same. The resulting product had a median particle size of 6.1 microns, a Digisorb PV of 2.03 cc/gm. a specific area of 238 m²/gm. and a centrifuge density of 0.18 gm/cc. The Al content was 0.30% Al. This represents the best mode now known to us for carrying out our invention.

EXAMPLE II

A silica hydrosol was prepared by combining a 35° Baume sulfuric acid solution with a 32° Baume sodium silicate solution ($Na_2O:SiO_2$ mole ratio 1:3.22). The hydrosol was allowed to set to a hydrogel, sized, and washed with hot water then aged with a hot ammonia solution for 18 hours. The solution was drained and the silicate was converted to an aerogel in a heated fluid energy mill at 500° C. plus. The pore volume of this commercial aerogel, which is used as SCM's Silcron G-100, (standard) is 1.37 cc/g, and has a 5 Hegman in our Nitrocellulose Lacquer formulation.

EXAMPLE III

A hydrogel prepared in a manner similar to Example I was washed, sized and then aged in a hot ammonia solution for 9 hours, drained and milled in a heated fluid energy mill at 530° C. to yield a silica aerogel with a pore volume of 1.74 cc/g, and was a better flatting agent in nitrocellose lacquer than the commercial standard shown in Example II. This product has a 5¼ Hegman and has gloss readings which are 12 points flatter at 60°, and 30 points flatter at 85° than the standard (Example II).

EXAMPLE IV

A silica hydrosol was prepared by combining 36° Baume sulfuric acid solution with a 32° Baume sodium silicate solution ($Na_2O:SiO_2$ mole ratio 1:3.22). The hydrosol was allowed to set to a hydrogel, sized, and washed with hot water then aged with hot ammonia solution for 18 hours. The hydrogel was drained. To 2000 grams of the drained hydrogel were added 20 liters of aluminum nitrate nonahydrate solution (5.1 g/l). This mixture was soaked for 2 hours with occasional stirring. The aluminum treated hydrogel was drained, and the sample was milled in a heated fluid energy mill at approximately 510° C. The aluminum stabilized aerogel has a pore volume of 1.56 cc/g. In nitrocellulose lacquer formulation the aerogel had a 3 Hegman and was glossy compared to the standard in Example II, namely +3 at 60°, and +8 at 85°.

EXAMPLE V

The hydrogel was prepared as shown in Example III with an ammonia age of 9 hours. To 2000 grams of the drained hydrogel was added 20 liters of aluminum nitrate nonahydrate solution (5.1 g/l) and soaked with occasional stirring for 2 hours. The aluminum stabilized hydrogel was drained and micronized in a heated fluid energy mill. The pore volume was 1.86 cc/g, and in a nitrocellulose lacquer formula had a 5¼ Hegman with 4 points flatter at 60°, and equal to standard at 85° using a high shear system (Cowles Dissolver). However, high pore volumes should give the silica gels better stir-in qualities at low shear. This was proven when stir-in qualities were measured for 15 minutes with high shear vs. low shear stirrings. The standard (Example II) yielded a 3½ Hegman while this product had a 5 Hegman, with gloss readings 11 points flatter at 60° and 7 points flatter at 85°.

EXAMPLE VI

A standard Silcron type material was made in accordance with Example II above. Prior to drying and milling, 4000 gms. of silica gel was tumbled in a roller mill for 2 hours with 20 liters of Aluminum Sulphate water solution containing 2.7 grams per liter of the sulfate salt. The product was separated from the solution and air dried and showed a loss on drying of 70.0%. The feed stock had a Pore Volume of 2.2. After milling at a temperature of from 310° C. to 240° C. for 6 minutes at air inlet pressure of 60 psi and exit pressure 50 psi, by-pass open 5.0. The feed rate was 48–50 grams/minute. The ring size was 4.5", +0.25 timble position and +¼ injector position. The product had a pore volume of 1.74 cm$^3$/gm. and a surface area of 246 gms. linseed oil/100 gms. of aerogel.

The Hegman grind was 4.5D. Eleven grams were blended into 140 gms. Nitrocellulose lacquer. The texture of the film was equal to standard (untreated Silcron G-100). Gloss at 60° was 3 units better than standard and at 85° was also 3 units better (flatter) than standard.

In using the high pore volume silicas of the present invention the techniques of addition of silica flatting agents to various paints, varnishes, lacquers, enamels, etc., which are currently in use and are well known may be used. These silicas stir into the coating composition readily. Reference may be had to the patent to Cohen et al U.S. Pat. No. 4,097,302 for details of adding silica flatting agent to a coating composition.

What is claimed is:

1. A process for producing a silica gel having improved pore volume relative to conventional silica gels which process comprises the steps of gelling an aqueous alkali metal silicate with an aqueous acid, washing the resulting gel to remove salt or salts and acid, aging said gel for 3 to 36 hours with aqueous ammonia solution and soaking the gel in an aqueous solution of a water soluble aluminum salt to impart from 0.1 to 0.7% by weight aluminum on the dry basis to said gel, drying and reducing the particle size of the dried gel to from 2.0 to 15 microns, said particles having a pore volume in the range of 1.25 to 2.25 cm$^3$/gram.

2. A product produced by the process of claim 1.

3. A process as defined in claim 1 wherein the alkali metal silicate is sodium silicate.

4. A process as defined in claim 1 wherein the aqueous acid is a water solution of a mineral acid.

5. A process as defined in claim 4 wherein the mineral acid is hydrochloric acid.

6. A process as defined in claim 4 wherein the mineral acid is sulphuric acid.

7. A process as defined in claim 6 wherein the acid is 35° Baume.

8. A process as defined in claim 1 wherein the aluminum salt is aluminum nitrate.

9. A process as defined in claim 1 wherein the gel is soaked in the aqueous solution of aluminum salt for a period of at least about 2 hours.

10. A process as defined in claim 9 wherein the aluminum salt is aluminum nitrate nonahydrate.

11. A process as defined in claim 10 wherein the aluminum salt is aluminum sulfate dodecahydrate.

12. A process as defined in claim 1 wherein the silica gel is a silica hydrogel.

13. A process as defined in claim 1 wherein the silica gel is a silica aerogel.

14. A process as defined in claim 1 wherein the temperature of drying the aluminum salt treated gel is from 200°–600° C.

15. A process as defined in claim 14 wherein the temperature of drying the aluminum salt treated gel is from 500°–600° C.

16. A process as defined in claim 1 wherein drying the milling occur simultaneously in a fluid energy mill.

* * * * *